United States Patent
Lackey

(10) Patent No.: US 10,857,489 B2
(45) Date of Patent: Dec. 8, 2020

(54) COOKING OIL DISPOSAL ASSEMBLY

(71) Applicant: Linda Lackey, Covington, GA (US)

(72) Inventor: Linda Lackey, Covington, GA (US)

( * ) Notice: Subject to any disclaimer, the term of this patent is extended or adjusted under 35 U.S.C. 154(b) by 186 days.

(21) Appl. No.: 16/167,628

(22) Filed: Oct. 23, 2018

(65) Prior Publication Data
US 2020/0122061 A1  Apr. 23, 2020

(51) Int. Cl.
B01D 29/13 (2006.01)
A47J 37/12 (2006.01)
B65D 25/28 (2006.01)
B65D 43/02 (2006.01)

(52) U.S. Cl.
CPC .......... B01D 29/13 (2013.01); A47J 37/1223 (2013.01); B65D 25/2808 (2013.01); B65D 25/2811 (2013.01); B65D 43/0202 (2013.01)

(58) Field of Classification Search
None
See application file for complete search history.

(56) References Cited

U.S. PATENT DOCUMENTS

| | | | | |
|---|---|---|---|---|
| 1,641,051 A * | 8/1927 | Rheney | .................. | B65D 25/42 222/189.07 |
| 1,948,771 A * | 2/1934 | Rucker | ..................... | C11B 1/00 210/244 |
| 2,247,040 A * | 6/1941 | Whitsett | ............. | A47J 37/1223 210/238 |
| 3,184,100 A | 5/1965 | Thomas | | |
| 3,487,439 A * | 12/1969 | Winston | ............... | A47J 37/1271 206/524.1 |
| 4,237,857 A * | 12/1980 | Sharp, Sr. | ............. | B60P 1/5433 126/19.5 |
| 4,319,762 A * | 3/1982 | Streit | .................... | B65F 1/1623 280/79.2 |
| 4,360,046 A * | 11/1982 | Streit | ...................... | C11B 13/00 141/231 |
| 4,450,828 A * | 5/1984 | Onken | .................. | B60P 3/2295 126/19.5 |
| 4,485,831 A * | 12/1984 | Ungerleider | ........ | A47J 37/1271 137/1 |
| 4,555,339 A * | 11/1985 | Graves | .................... | A47J 43/28 210/244 |
| 4,604,203 A * | 8/1986 | Kyle | ................... | A47J 37/1223 210/489 |

(Continued)

FOREIGN PATENT DOCUMENTS

WO  WO2007139739  12/2007

Primary Examiner — Robert J Popovics

(57) ABSTRACT

A cooking oil disposal assembly includes a pot for receiving used cooking oil. A filter is removably positionable in the pot and the filter is comprised of a fluid permeable material to filter particles from the used cooking oil. A cover is hingedly coupled to the pot and the cover is positionable between a closed position and an open position. A bowl is removably positionable in the cover and the bowl is comprised of a fluid impermeable material to capture the used cooking oil. The bowl is disposed of when the bowl is removed from the pot to facilitate the used cooking oil to be disposed without pouring the used cooking oil down sewer pipes. A blower is coupled to the cover and the blower urging air upwardly onto the bowl when the blower is turned on to cool the used cooking oil in the bowl.

8 Claims, 4 Drawing Sheets

(56) References Cited

U.S. PATENT DOCUMENTS

| | | | | |
|---|---|---|---|---|
| 4,624,468 A * | 11/1986 | Onken | B65F 1/1473 | 280/43.2 |
| 4,823,947 A * | 4/1989 | Maynard, Jr. | B01D 41/04 | 141/98 |
| 4,895,250 A * | 1/1990 | Schifrin | B65D 5/60 | 206/223 |
| 4,930,906 A * | 6/1990 | Hemphill | B65D 31/02 | 229/117.27 |
| 4,984,907 A * | 1/1991 | Power | B32B 5/26 | 383/109 |
| 5,000,341 A * | 3/1991 | Shirota | B08B 17/02 | 126/51 |
| 5,196,040 A * | 3/1993 | Malloy | B01D 46/0002 | 126/299 R |
| 5,322,196 A * | 6/1994 | Burton | A47J 37/1271 | 210/244 |
| D352,212 S * | 11/1994 | Burton | D7/317 | |
| 5,427,267 A * | 6/1995 | Willman | B65D 77/02 | 229/117.34 |
| 5,622,276 A * | 4/1997 | Simmons | B65D 11/1833 | 220/495.08 |
| 5,718,220 A * | 2/1998 | Onken | B60P 3/2295 | 126/343.5 A |
| 5,814,396 A * | 9/1998 | Weidner | A47J 36/027 | 219/733 |
| 5,832,810 A * | 11/1998 | Brawley, Sr. | A47J 37/1271 | 99/408 |
| 5,908,551 A * | 6/1999 | Onken | A47J 37/1271 | 210/184 |
| 5,911,346 A * | 6/1999 | Onken | B65D 25/38 | 220/DIG. 5 |
| 6,126,018 A * | 10/2000 | Cone | A47J 43/284 | 210/469 |
| 6,227,405 B1 * | 5/2001 | Andreoli | A47J 37/1271 | 220/210 |
| 6,355,168 B1 * | 3/2002 | White | A47J 37/1285 | 210/236 |
| 6,394,313 B1 * | 5/2002 | Wesley | A47J 37/1271 | 210/244 |
| 6,981,498 B2 * | 1/2006 | Onken | A47J 37/1271 | 126/343.5 A |
| 7,137,419 B1 * | 11/2006 | Reeves | B01D 29/085 | 141/340 |
| 7,377,210 B1 * | 5/2008 | Franco | A47J 37/1271 | 141/340 |
| 7,563,495 B2 * | 7/2009 | Anelli | B65D 17/163 | 426/122 |
| 7,731,846 B1 * | 6/2010 | Jones | B65F 1/06 | 210/248 |
| 8,016,150 B1 * | 9/2011 | Bunch | A47J 37/1271 | 220/571 |
| 8,109,671 B1 * | 2/2012 | Baker | B65D 31/16 | 383/35 |
| 8,246,824 B2 * | 8/2012 | Larin | B65F 1/02 | 210/237 |
| D667,699 S * | 9/2012 | Brockington | D7/629 | |
| 8,622,982 B2 * | 1/2014 | Laugesen | A47L 13/16 | 604/317 |
| 8,826,806 B2 * | 9/2014 | Difante | A47J 27/18 | 210/483 |
| 8,905,257 B2 * | 12/2014 | Brown | B65F 1/1607 | 220/254.3 |
| D721,533 S * | 1/2015 | Coco | D7/368 | |
| 9,192,265 B1 * | 11/2015 | Johnson | A47J 37/108 | |
| 9,572,362 B2 * | 2/2017 | Difante | A23L 5/11 | |
| 9,723,955 B2 * | 8/2017 | Booker | A47J 37/10 | |
| 9,783,363 B2 * | 10/2017 | Brantley | B65F 1/1607 | |
| 9,820,618 B1 * | 11/2017 | Fiedler | B01D 35/027 | |
| 9,856,636 B2 * | 1/2018 | Santos | E03C 1/26 | |
| 10,246,862 B2 * | 4/2019 | Santos | C02F 1/40 | |
| 10,493,389 B2 * | 12/2019 | Siegert | C11B 3/008 | |
| 2004/0031539 A1 * | 2/2004 | Goodwin | B65F 1/1607 | 141/98 |
| 2004/0045905 A1 * | 3/2004 | Churchman | C09K 3/32 | 210/660 |
| 2004/0188448 A1 * | 9/2004 | Hudson | A47J 37/0786 | 220/669 |
| 2006/0204621 A1 * | 9/2006 | Piepenbrink | B65F 1/00 | 426/106 |
| 2007/0267415 A1 | 11/2007 | Valenti | | |
| 2009/0317023 A1 * | 12/2009 | Baker | A47J 47/18 | 383/84 |
| 2011/0120996 A1 * | 5/2011 | Larin | B65F 1/02 | 220/212 |
| 2011/0189361 A1 * | 8/2011 | Rao | C11B 3/10 | 426/417 |
| 2012/0279930 A1 * | 11/2012 | Iceton | A47J 37/1271 | 210/767 |
| 2012/0311972 A1 * | 12/2012 | Hunter | B65D 3/06 | 53/471 |
| 2018/0098664 A1 * | 4/2018 | Siegert | C11B 3/10 | |
| 2018/0099238 A1 * | 4/2018 | Siegert | B01D 39/1607 | |
| 2018/0318741 A1 * | 11/2018 | Siegert | B01D 39/14 | |
| 2018/0361286 A1 * | 12/2018 | Siegert | B01D 39/14 | |

\* cited by examiner

COOKING OIL DISPOSAL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to disposal devices and more particularly pertains to a new disposal device for collecting and thusly disposing of used cooking oil.

BRIEF SUMMARY OF THE INVENTION

An embodiment of the disclosure meets the needs presented above by generally comprising a pot for receiving used cooking oil. A filter is removably positionable in the pot and the filter is comprised of a fluid permeable material to filter particles from the used cooking oil. A cover is hingedly coupled to the pot and the cover is positionable between a closed position and an open position. A bowl is removably positionable in the cover and the bowl is comprised of a fluid impermeable material to capture the used cooking oil. The bowl is disposed of when the bowl is removed from the pot to facilitate the used cooking oil to be disposed without pouring the used cooking oil down sewer pipes. A blower is coupled to the cover and the blower urging air upwardly onto the bowl when the blower is turned on to cool the used cooking oil in the bowl.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
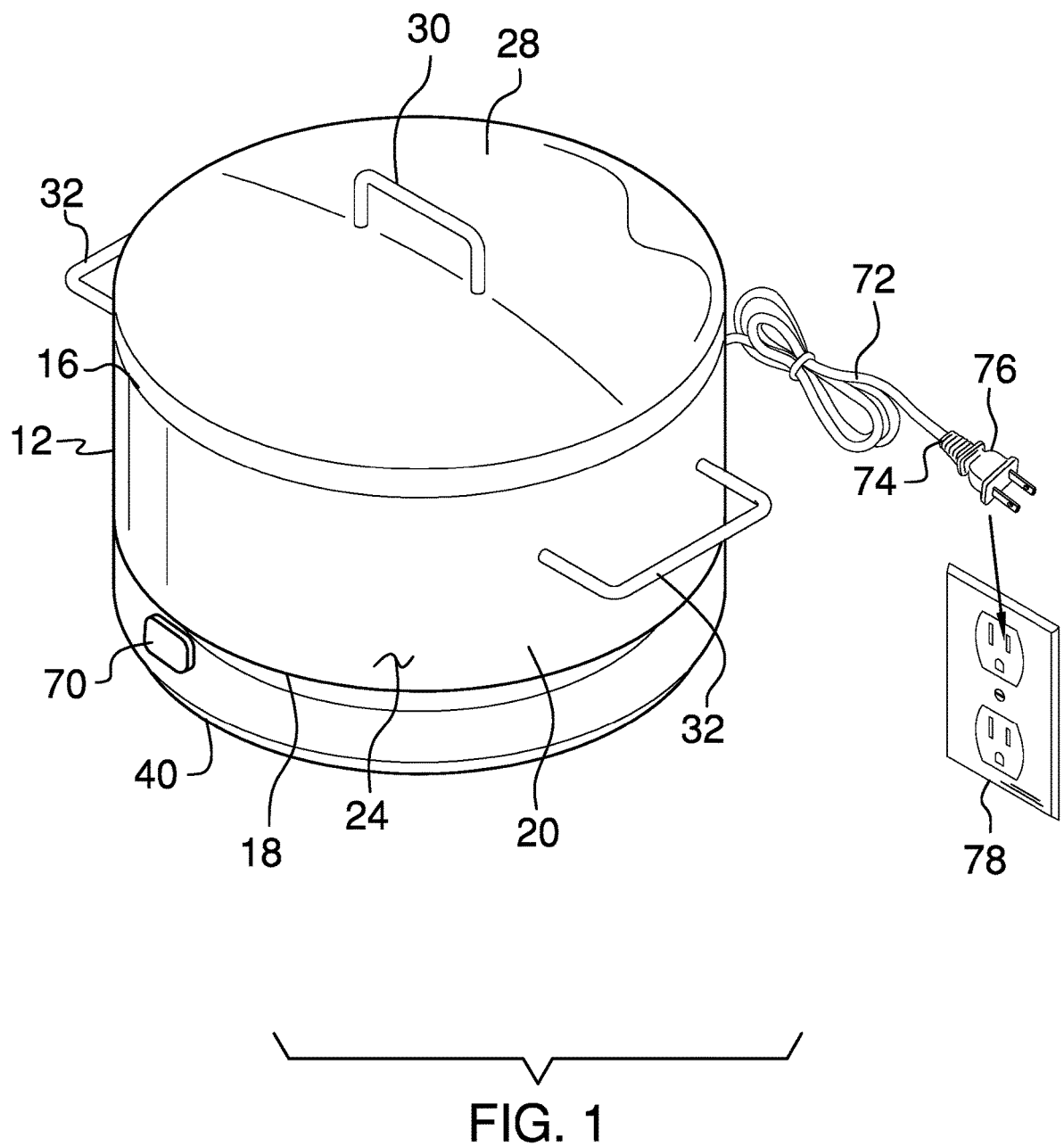
FIG. 1 is a perspective view of a cooking oil disposal assembly according to an embodiment of the disclosure.
Figure 2:
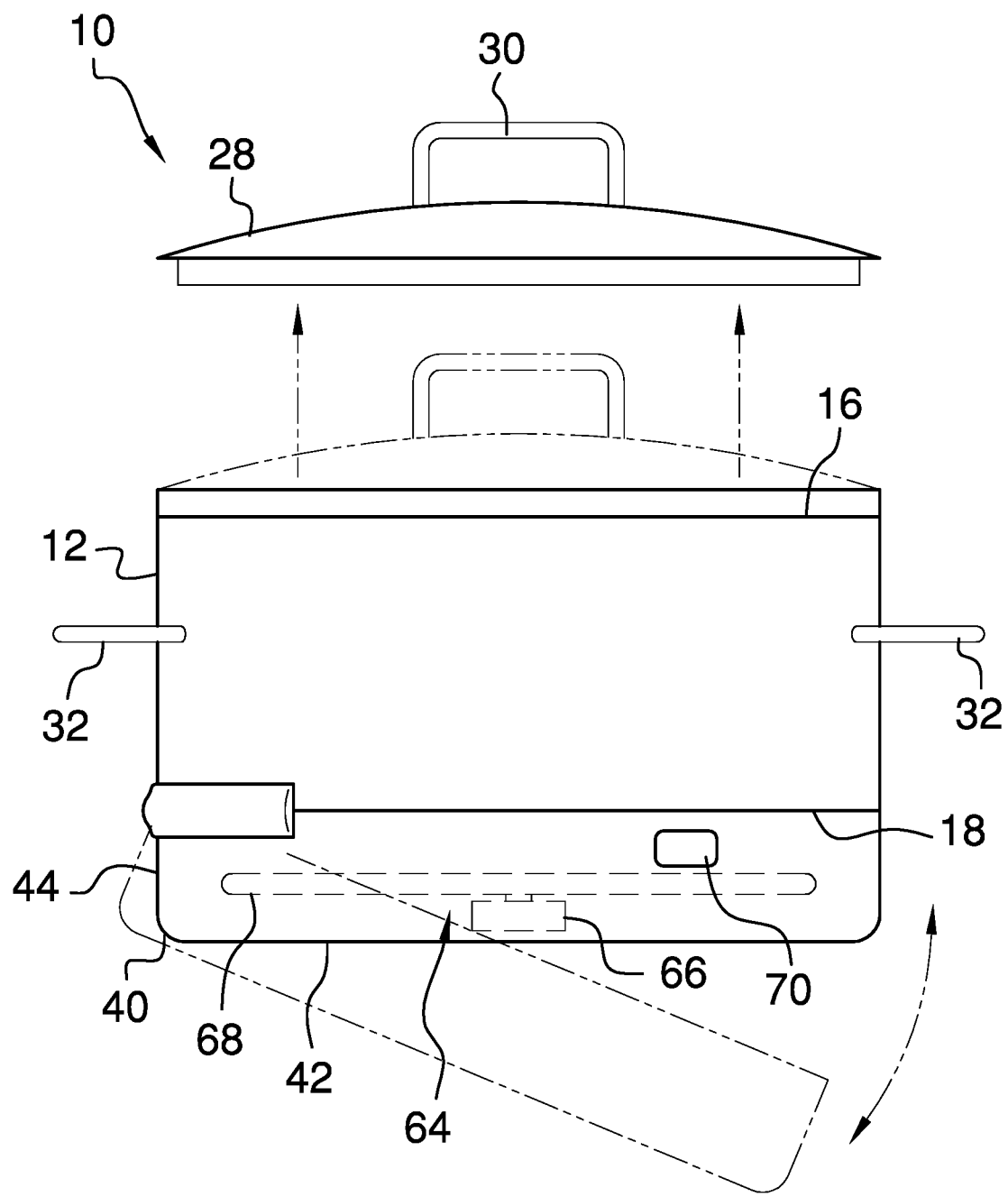
FIG. 2 is a front exploded view of an embodiment of the disclosure.
Figure 3:
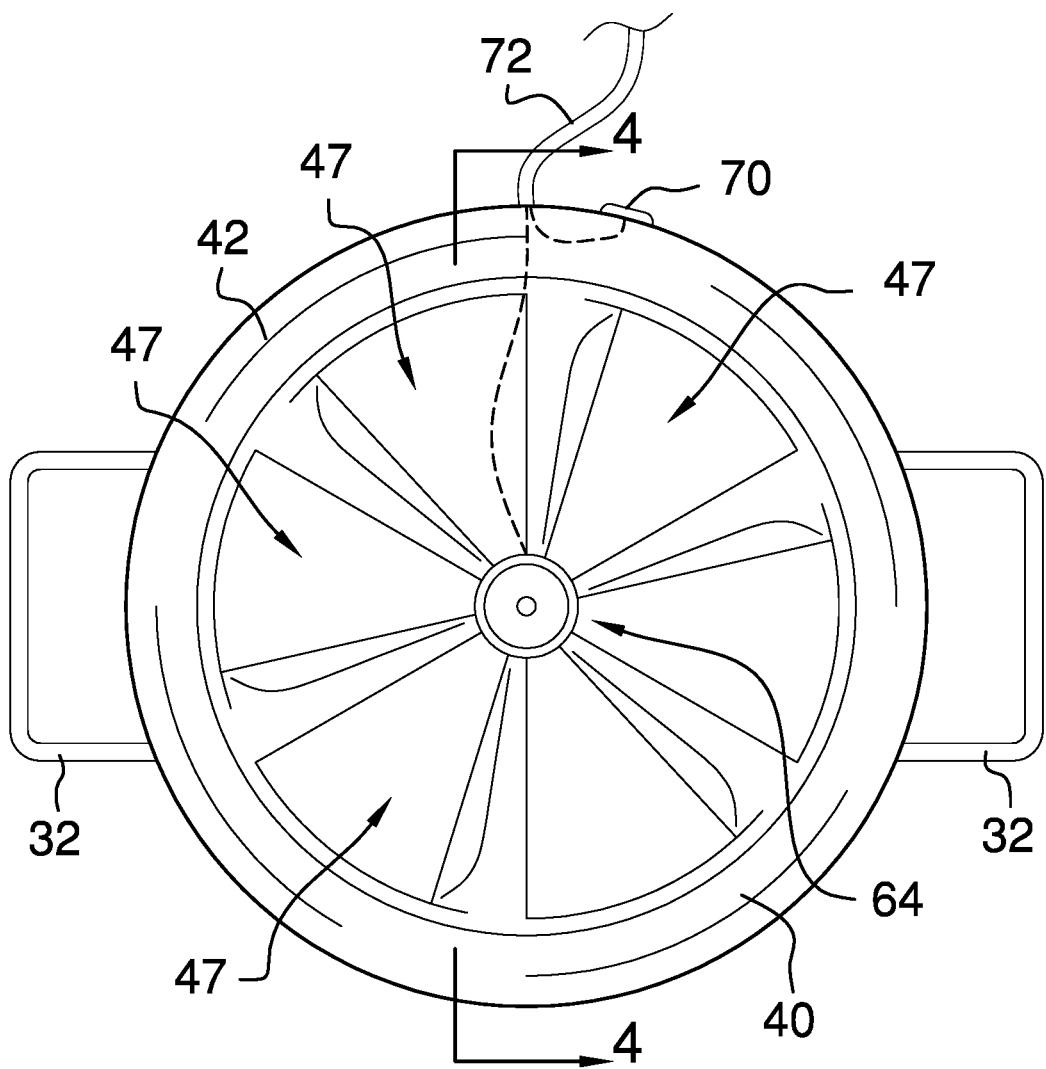
FIG. 3 is a bottom view of an embodiment of the disclosure.
Figure 4:
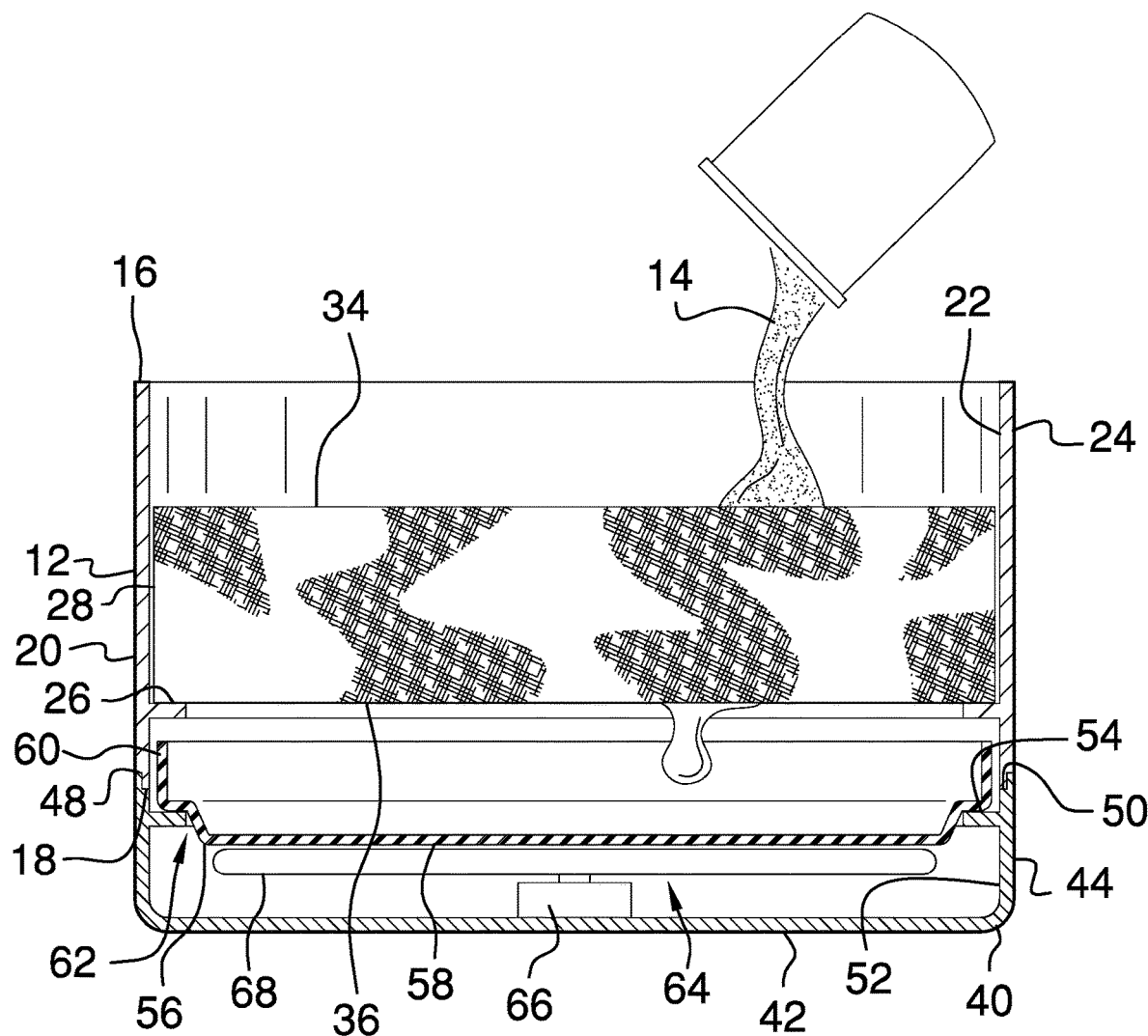
FIG. 4 is a cross sectional view taken along line 4-4 of FIG. 3 of an embodiment of the disclosure.

With reference now to the drawings, and in particular to FIGS. 1 through 4 thereof, a new disposal device embodying the principles and concepts of an embodiment of the disclosure and generally designated by the reference numeral 10 will be described.

As best illustrated in FIGS. 1 through 4, the cooking oil disposal assembly 10 generally comprises a pot 12 for receiving used cooking oil 14. The pot 12 has a top end 16, a bottom end 18 and an outer wall 20 extending therebetween, and each of the top 16 and bottom 18 ends is open into an interior of the pot 12. The outer wall 20 has an inside surface 22 and an outside surface 24, and the outer wall 20 has a ledge 26 extending inwardly from the inside surface 22. The ledge 26 extends around an entire circumference of the inside surface 22 and the ledge 26 is positioned closer to the bottom end 18 of the pot 12 than the top end 16 of the pot 12. A lid 28 is removably positioned on the pot 12 for closing the pot 12 and the lid 28 is positionable on the top end 16 of the pot 12. A first handle 30 is coupled to the lid 28 for gripping and thusly manipulating the lid 28. A pair of second handles 32 is each coupled to the outer wall 20 of the pot 12 for gripping and thusly manipulating the pot 12.

A filter 34 is provided and the filter 34 is removably positionable in the pot 12. The filter 34 is comprised of a fluid permeable material to filter particles from the used cooking oil 14. The filter 34 has a lower surface 36 and an outer surface 38. Additionally, the lower surface 36 rests on the ledge 26 having the outer surface 38 being spaced from and being coextensive with the inside surface 22 of the outer wall 20.

A cover 40 is hingedly coupled to the pot 12 and the cover 40 is positionable between a closed position and an open position. The cover 40 has a basal wall 42 and a perimeter wall 44 extending upwardly therefrom. The perimeter wall 44 is continuously arcuate such that the cover 40 has a circular shape and the perimeter wall 44 has a distal edge 46 with respect to the basal wall 42. Moreover, the distal edge 46 is hingedly coupled to the bottom end 18 of the pot 12. The distal edge 46 engages the bottom end 18 of the pot 12 when the cover 40 is positioned in the closed position. The basal wall 42 has a plurality of air openings 47 extending therethrough for passing air into the cover 40 when the cover 40 is closed.

The bottom end 18 of the pot 12 may have a first groove 48 extending upwardly toward to the top end 16 of the pot 12. The distal edge 46 of the perimeter wall 44 of the cover 40 may have a second groove 50 extending downwardly toward the basal wall 42 of the cover 40. The second groove 50 may engage the first groove 48 when the cover 40 is positioned on the closed position. The perimeter wall 44 has an inwardly facing surface 52 and the perimeter wall 44 has a lip 54 extending inwardly from the inwardly facing surface 52. The lip 54 is coextensive with the inwardly facing surface 52 and is spaced from the basal wall 42.

A bowl 56 is provided and the bowl 56 is removably positionable in the cover 40. The bowl 56 is comprised of a fluid impermeable material to capture the used cooking oil 14. Additionally, the bowl 56 is comprised of a heat resistant material to resist being melted by the used cooking oil 14. The bowl 56 may be comprised of a deformable material thereby facilitating the bowl 56 to be closed in the convention of a bag when the bowl 56 is removed from the pot 12. Moreover, the bowl 56 may have a fluid capacity ranging between approximately 10.0 fluid ounces and 20.0 fluid ounces.

The bowl 56 has a lower wall 58 and an outside wall 60 extending upwardly therefrom. The outside wall 60 has an indentation 62 extending around an entire circumference of the outside wall 60. Moreover, the indentation 62 rests on the lip 54 on the perimeter wall 44 of the cover 40 having the lower wall 58 being spaced from the basal wall 42 of the cover 40. The bowl 56 is removable from the pot 12 when the bowl 56 is filled with the used cooking oil 14. Additionally, the bowl 56 is disposed of when the bowl 56 is removed from the pot 12. In this way the used cooking oil 14 can be disposed of without pouring the used cooking oil 14 down sewer pipes such as a drain in a sink or the like.

A blower 64 is coupled to the cover 40 and the blower 64 urges air upwardly onto the bowl 56 when the blower 64 is turned on. In this way the blower 64 cools the used cooking oil 14 in the bowl 56 prior to removing the bowl 56 from the pot 12. The blower 64 comprises a motor 66 that is coupled to the basal wall 42 of the cover 40 and the motor 66 is positioned within the cover 40. A fan 68 is rotatably coupled to the motor 66 and the fan 68 urges air upwardly onto the lower wall 58 of the bowl 56 when the motor 66 is turned on. The motor 66 may be an electric motor and the fan 68 may include a plurality of fan blades.

A switch 70 is coupled to the cover 40 and the switch 70 is electrically coupled to the motor 66 for turning the motor 66 on and off. A power cord 72 is electrically coupled to the switch 70 and the power cord 72 extends outwardly from the outside wall 60 of the cover 40. The power cord 72 has a distal end 74 with respect to the cover 40 and a plug 76 is electrically coupled to the distal end 74. The plug 76 can be plugged into a power source 78, such as a female electrical outlet or the like.

In use, the lid 28 is removed from the pot 12 and the used cooking oil 14 is poured into the pot 12. The used cooking oil 14 passes through the filter 34 for filtering particles out of the used cooking oil 14. The bowl 56 collects the used cooking oil 14 when the used cooking oil 14 passes through the filter 34. The switch 70 is manipulated to turn the motor 66 on and thusly rotate the fan 68 for cooling the bowl 56. The bowl 56 is removable from the pot 12 when the bowl 56 is filled with the used cooking oil 14 and when the used cooking oil 14 has been cooled. Thus, the bowl 56 can be disposed of in a garbage can or the like thereby eliminating the need to pour the used cooking oil 14 down sewer pipes.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cooking oil disposal assembly being configured to contain used cooking oil for disposal, said assembly comprising:
    a pot for receiving used cooking oil;
    a lid being removably positioned on said pot for closing said pot;
    a filter being removably positionable in said pot, said filter being comprised of a fluid permeable material wherein said filter is configured to filter particles from the used cooking oil;
    a cover being hingedly coupled to said pot, said cover being positionable between a closed position and an open position;
    a bowl being removably positionable in said cover, said bowl being comprised of a fluid impermeable material wherein said bowl is configured to capture the used cooking oil, said bowl being comprised of a heat resistant material wherein said bowl is configured to resist being melted by the used cooking oil, said bowl being discarded when said bowl is removed from said pot wherein said bowl is configured to facilitate the used cooking oil to be disposed without pouring the used cooking oil down sewer pipes; and
    a blower being coupled to said cover, said blower urging air upwardly onto said bowl when said blower is turned on wherein said blower is configured to cool the used cooking oil in said bowl prior to removing said bowl from said cover.

2. The assembly according to claim 1, wherein:
    said pot having a top end, a bottom end and an outer wall extending therebetween, each of said top and bottom ends being open into an interior of said pot, said outer wall having an inside surface and an outside surface;
    said outer wall has a ledge extending inwardly from said inside surface, said ledge extending around an entire circumference of said inside surface, said ledge being positioned closer to said bottom end of said pot than said top end of said pot; and
    said filter has a lower surface and an outer surface, said lower surface resting on said ledge having said outer surface being spaced from and being coextensive with said inside surface of said outer wall.

3. The assembly according to claim 2, wherein:

said cover has a basal wall and a perimeter wall extending upwardly therefrom, said perimeter wall being continuously arcuate such that said cover has a circular shape, said perimeter wall having a distal edge with respect to said basal wall, said distal edge being hingedly coupled to said bottom end of said pot, said distal edge engaging said bottom end when said cover is positioned in said closed position, said perimeter wall having an inwardly facing surface; and said perimeter wall has a lip extending inwardly from said inwardly facing surface, said lip being coextensive with said inwardly facing surface and being spaced from said basal wall.

4. The assembly according to claim 3, wherein said bowl has a lower wall and an outside wall extending upwardly therefrom, said outside wall having an indentation extending around an entire circumference of said outside wall, said indentation resting on said lip on said perimeter wall of said cover having said lower wall being spaced from said basal wall of said cover, said bowl being removable from said pot when said bowl is filled with the used cooking oil.

5. The assembly according to claim 3, wherein said blower comprises:

a motor being coupled to said basal wall of said cover having said motor being positioned within said cover; and a fan being rotatably coupled to said motor, said fan urging air upwardly when said motor is turned on.

6. The assembly according to claim 5, further comprising a switch being coupled to said cover, said switch being electrically coupled to said motor for turning said motor on and off.

7. The assembly according to claim 6, further comprising a power cord being electrically coupled to said switch, said power cord extending outwardly from an outside wall of said cover, said power cord having a distal end with respect to said cover, said distal end having a plug being electrically coupled thereto, said plug being configured to be plugged into a power source.

8. A cooking oil disposal assembly being configured to contain used cooking oil for disposal, said assembly comprising:

a pot for receiving used cooking oil, said pot having a top end, a bottom end and an outer wall extending therebetween, each of said top and bottom ends being open into an interior of said pot, said outer wall having an inside surface and an outside surface, said outer wall having a ledge extending inwardly from said inside surface, said ledge extending around an entire circumference of said inside surface, said ledge being positioned closer to said bottom end of said pot than said top end of said pot;

a lid being removably positioned on said pot for closing said pot, said lid being positionable on said top end of said pot;

a first handle being coupled to said lid for gripping and thusly manipulating said lid;

a pair of second handles, each of said second handles being coupled to said outer wall of said pot for gripping and thusly manipulating said pot;

a filter being removably positionable in said pot, said filter being comprised of a fluid permeable material wherein said filter is configured to filter particles from the used cooking oil, said filter having a lower surface and an outer surface, said lower surface resting on said ledge having said outer surface being spaced from and being coextensive with said inside surface of said outer wall;

a cover being hingedly coupled to said pot, said cover being positionable between a closed position and an open position, said cover having a basal wall and a perimeter wall extending upwardly therefrom, said perimeter wall being continuously arcuate such that said cover has a circular shape, said perimeter wall having a distal edge with respect to said basal wall, said distal edge being hingedly coupled to said bottom end of said pot, said distal edge engaging said bottom end when said cover is positioned in said closed position, said perimeter wall having an inwardly facing surface, said perimeter wall having a lip extending inwardly from said inwardly facing surface, said lip being coextensive with said inwardly facing surface and being spaced from said basal wall;

a bowl being removably positionable in said cover, said bowl being comprised of a fluid impermeable material wherein said bowl is configured to capture the used cooking oil, said bowl being comprised of a heat resistant material wherein said bowl is configured to resist being melted by the used cooking oil, said bowl having a lower wall and an outside wall extending upwardly therefrom, said outside wall having an indentation extending around an entire circumference of said outside wall, said indentation resting on said lip on said perimeter wall of said cover having said lower ball being spaced from said basal wall of said cover, said bowl being removable from said pot when said bowl is filled with the used cooking oil, said bowl being discarded when said bowl is removed from said pot wherein said bowl is configured to facilitate the used cooking oil to be disposed without pouring the used cooking oil down sewer pipes; and a blower being coupled to said cover, said blower urging air upwardly onto said bowl when said blower is turned on wherein said blower is configured to cool the used cooking oil in said bowl prior to removing said bowl from said cover, said blower comprising:

a motor being coupled to said basal wall of said cover having said motor being positioned within said cover;

a fan being rotatably coupled to said motor, said fan urging air upwardly onto said lower wall of said bowl when said motor is turned on;

a switch being coupled to said cover, said switch being electrically coupled to said motor for turning said motor on and off; and a power cord being electrically coupled to said switch, said power cord extending outwardly from said outside wall of said cover, said power cord having a distal end with respect to said cover, said distal end having a plug being electrically coupled thereto, said plug being configured to be plugged into a power source.

* * * * *